United States Patent
Tsuruta et al.

(10) Patent No.: US 10,547,072 B2
(45) Date of Patent: Jan. 28, 2020

(54) FUEL CELL SYSTEM

(71) Applicant: TOYOTA JIDOSHA KABUSHIKI KAISHA, Toyota-shi, Aichi-ken (JP)

(72) Inventors: Yoshiaki Tsuruta, Nagakute (JP); Kohei Oda, Toyota (JP); Satoshi Watanabe, Okazaki (JP); Hideyuki Kumei, Sunto-gun (JP); Shuya Kawahara, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 194 days.

(21) Appl. No.: 15/725,651

(22) Filed: Oct. 5, 2017

(65) Prior Publication Data

US 2018/0108926 A1  Apr. 19, 2018

(30) Foreign Application Priority Data

Oct. 18, 2016 (JP) .................. 2016-204081

(51) Int. Cl.
  *H01M 8/04858*  (2016.01)
  *H01M 8/04089*  (2016.01)
  (Continued)

(52) U.S. Cl.
  CPC ... *H01M 8/04953* (2016.02); *H01M 8/04089* (2013.01); *H01M 8/04753* (2013.01);
  (Continued)

(58) Field of Classification Search
  CPC ......... H01M 8/04953; H01M 8/04089; H01M 8/04223; H01M 8/04753; H01M 8/04925;
  (Continued)

(56) References Cited

U.S. PATENT DOCUMENTS 3,471,337 A  10/1969 Fetterman
5,935,726 A  8/1999 Chow et al.
(Continued)

FOREIGN PATENT DOCUMENTS

JP  2007-103115 A  4/2007
JP  2008-192468  8/2008
(Continued)

OTHER PUBLICATIONS

Final Office Action issued in U.S. Appl. No. 15/806,575 dated May 16, 2019.

*Primary Examiner* — Gregg Cantelmo
(74) *Attorney, Agent, or Firm* — Finnegan, Henderson, Farabow, Garrett & Dunner, LLP

(57) ABSTRACT

A fuel cell system of the present disclosure performs a first and a second catalyst activation process, and the first catalyst activation process is performed where a flow rate of the air supplied to the fuel cell by the air compressor is reduced to be less than that before the refresh control is performed while keeping an amount of a current drawn from the fuel cell by the fuel cell converter at the same value as that before the refresh control is performed, and the second catalyst activation process is performed where the value of the current drawn from the fuel cell by the fuel cell converter is increased to be greater than that before the refresh control is performed while keeping the flow rate of the air supplied to the fuel cell by the air compressor at the same value as that before the refresh control is performed.

3 Claims, 7 Drawing Sheets

(51) Int. Cl.
*H01M 8/04746* (2016.01)
*H01M 16/00* (2006.01)
*H01M 8/04828* (2016.01)
*H01M 10/48* (2006.01)
*H01M 8/04223* (2016.01)

(52) U.S. Cl.
CPC ..... *H01M 8/04925* (2013.01); *H01M 16/006* (2013.01); *H01M 2250/20* (2013.01)

(58) Field of Classification Search
CPC .. H01M 8/0494; H01M 10/48; H01M 16/006; H01M 2250/20; Y02T 90/32
See application file for complete search history.

(56) References Cited

U.S. PATENT DOCUMENTS

| | | |
|---|---|---|
| 5,998,054 A | 12/1999 | Jones et al. |
| 5,998,058 A | 12/1999 | Fredley |
| 6,103,412 A | 8/2000 | Hirano et al. |
| 6,258,198 B1 | 7/2001 | Saito et al. |
| 6,258,476 B1 | 7/2001 | Cipollini |
| 6,284,399 B1 | 9/2001 | Oko et al. |
| 6,376,110 B1 | 4/2002 | Koschany |
| 6,709,777 B2 | 3/2004 | Hagans et al. |
| 6,753,106 B2 | 6/2004 | Chow et al. |
| 6,841,283 B2 | 1/2005 | Breault |
| 7,112,379 B2 | 9/2006 | Skiba |
| 7,132,192 B2 | 11/2006 | Muthuswamy et al. |
| 8,932,775 B2 | 1/2015 | Hamada et al. |
| 2002/0009623 A1 | 1/2002 | St-Pierre et al. |
| 2005/0053814 A1 | 3/2005 | Imamura et al. |
| 2005/0147853 A1 | 7/2005 | Kaufmann et al. |
| 2005/0158610 A1 | 7/2005 | Keegan |
| 2005/0260463 A1 | 11/2005 | Chapman et al. |
| 2006/0008695 A1 | 1/2006 | Bai et al. |
| 2007/0179636 A1* | 8/2007 | Shige .................... B60W 10/08 700/22 |
| 2008/0138689 A1 | 6/2008 | Leo et al. |
| 2008/0248351 A1* | 10/2008 | Wake ................. H01M 8/04097 429/413 |
| 2010/0068577 A1 | 3/2010 | Umayahara et al. |
| 2010/0092819 A1 | 4/2010 | Umayahara et al. |
| 2010/0112401 A1 | 5/2010 | Noto et al. |
| 2010/0151341 A1 | 6/2010 | Manabe et al. |
| 2010/0167141 A1 | 7/2010 | Son et al. |
| 2011/0003221 A1 | 1/2011 | Mizuno |
| 2011/0294026 A1 | 12/2011 | Hamada et al. |
| 2012/0225330 A1* | 9/2012 | Umayahara ............... B60L 7/16 429/9 |
| 2015/0104721 A1 | 4/2015 | Choo et al. |
| 2015/0111122 A1 | 4/2015 | Matsusue et al. |
| 2015/0180070 A1 | 6/2015 | Matsusue et al. |
| 2018/0145356 A1 | 5/2018 | Tsuruta et al. |

FOREIGN PATENT DOCUMENTS

| | | |
|---|---|---|
| JP | 2008-218340 | 9/2008 |
| JP | 2009-016331 A | 1/2009 |
| JP | 2009-176666 | 8/2009 |
| JP | 2010-118252 A | 5/2010 |
| JP | 2012-185968 A | 9/2012 |
| JP | 2013-101844 A | 5/2013 |
| JP | 2013-105654 | 5/2013 |
| JP | 2013-161571 | 8/2013 |
| JP | 2013-232361 A | 11/2013 |
| JP | 2013-243009 | 12/2013 |
| JP | 2014-078412 A | 5/2014 |
| JP | 2014-212018 | 11/2014 |
| JP | 2015-079729 A | 4/2015 |
| JP | 2016-152227 | 8/2016 |
| WO | WO 2013/128609 | 9/2013 |

* cited by examiner

FUEL CELL SYSTEM

CROSS REFERENCE TO RELATED APPLICATIONS

This application is based upon and claims the benefit of priority from Japanese patent application No. 2016-204081, filed on Oct. 18, 2016 the disclosure of which is incorporated herein in its entirety by reference.

BACKGROUND

The present disclosure relates to a fuel cell system, for example, to a fuel cell system that performs refresh control on a fuel cell.

In a fuel cell, refresh control is performed in which an output potential of the fuel cell is lowered in order to perform a catalyst activation process on the fuel cell. The technique relating to this refresh control is disclosed in Japanese Unexamined Patent Application Publication No. 2013-161571.

In a fuel cell system disclosed in Japanese Unexamined Patent Application Publication No. 2013-161571, a controller performs an intermittent operation in which power production of a fuel cell stack is reduced. In the intermittent operation, when required electric power from a load is a predetermined value or less, the controller repeatedly stops and restarts supply of reactive gas while keeping a power production voltage of the fuel cell stack within in an allowable voltage range. When the SOC increases and exceeds an accumulated power threshold TH1, both an upper limit voltage value EH and a lower limit voltage value EL that define the allowable voltage range are increased.

SUMMARY

In the technique disclosed in Japanese Unexamined Patent Application Publication No. 2013-161571, the system is configured in such a way that, when a SOC (State Of Charge) of a storage battery is high, an upper limit voltage EH and a lower limit voltage EL that are set in the fuel cell are increased in order to lower the amount of power production of the fuel cell. Thus, the present inventor has found a problem in the technique disclosed in Japanese Unexamined Patent Application Publication No. 2013-161571 that the output potential of the fuel cell cannot be lowered enough, thereby disabling the catalyst activation process from being sufficiently performed.

The present disclosure has been made in view of the above circumstances. An object of the present disclosure is to sufficiently perform a catalyst activation process on a fuel cell regardless of an SOC of a storage battery.

An example aspect of the present disclosure is a fuel cell system including; a fuel cell, an amount of power production of the fuel cell being controlled according to an air flow rate; a fuel cell converter configured to boost an output voltage of the fuel cell to a system voltage and supplies it to system power supply wiring connected to a load circuit; an air compressor configured to supply air to the fuel cell; a secondary battery configured to input/output electric power from/to the system power supply wiring; and a control unit configured to, when refresh control is performed, calculate a state of charge of the secondary battery using an output voltage and an output current of the secondary battery and control the air compressor and the fuel cell converter based on the calculated state of charge. The control unit, when the state of charge is equal to or greater than a preset control switching threshold, performs a first catalyst activation process where a flow rate of the air supplied to the fuel cell by the air compressor is reduced to be less than that before the refresh control is performed while keeping an amount of a current drawn from the fuel cell by the fuel cell converter at the same value as that before the refresh control is performed, while when the state of charge is less than the control switching threshold, performs a second catalyst activation process where the value of the current drawn from the fuel cell by the fuel cell converter is increased to be greater than that before the refresh control is performed while keeping the flow rate of the air supplied to the fuel cell by the air compressor at the same value as that before the refresh control is performed.

According to this example aspect of the present disclosure, by switching a method of the catalyst activation process of the fuel cell according to an SOC of the secondary battery, a voltage of the fuel cell can be lowered by an appropriate range regardless of the state of charge of the secondary battery so as to sufficiently perform the catalyst activation process.

Another example aspect of the present disclosure is the fuel cell system, in which the control switching threshold is a preset target state of charge of the secondary battery.

According to this example aspect of the present disclosure, the state of charge of the secondary battery can be brought close to the target charge of state using the refresh control.

Another example aspect of the present disclosure is the fuel cell system, in which the control switching threshold includes a first control switching state of charge and a second control switching state, the first control switching state indicating a state of charge greater than the preset target state of charge of the secondary battery, and the second control switching state of charge indicating a state of charge lower than the target state of charge. Further, the control unit performs, when the state of charge becomes equal to or greater than the first control switching state of charge, performs the first catalyst activation process, and, when the state of charge becomes less than the second control switching state of charge, performs the second catalyst activation process.

According to this example aspect of the present disclosure, it is possible to prevent an activation method of the catalyst activation process from being frequently switched near the target charge of state to thereby achieve a stable catalyst activation process.

Another example aspect of the present disclosure is the fuel cell system in which when the fuel cell satisfies a preset deterioration condition, the control unit does not perform the first catalyst activation process and the second catalyst activation process.

According to this example aspect of the present disclosure, it is possible to prevent deterioration of the fuel cell from progressing by the refresh control.

According to the fuel cell system of the present disclosure, it is possible to sufficiently lower the output voltage of the fuel cell and to sufficiently activate a catalyst of the fuel cell regardless of the state of charge of the secondary battery.

The above and other objects, features and advantages of the present invention will become more fully understood from the detailed description given hereinbelow and the accompanying drawings which are given by way of illustration only, and thus are not to be considered as limiting the present invention.

DESCRIPTION OF EMBODIMENTS

First Embodiment

Hereinafter, embodiments of the present disclosure will be described in detail with reference to the drawings. For the clarification of the description, the following description and the drawings may be omitted or simplified as appropriate. Throughout the drawings, the same components are denoted by the same reference signs and overlapping descriptions will be omitted as appropriate.

Figure 1:
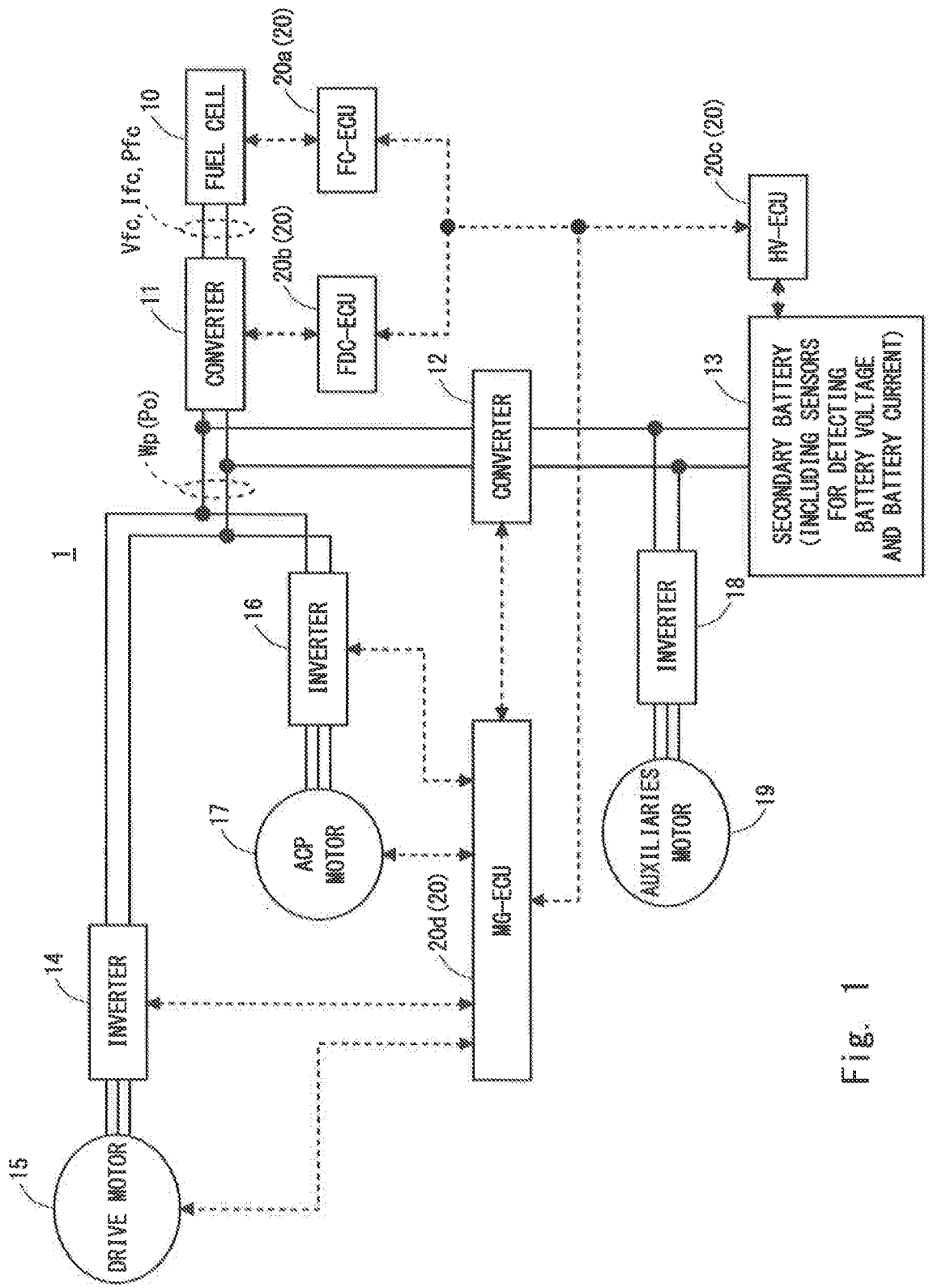
FIG. 1 is a block diagram of a fuel cell system according to a first embodiment.

FIG. 1 is a block diagram of a fuel cell system 1 according to a first embodiment. As shown in FIG. 1, the fuel cell system 1 according to the first embodiment includes a fuel cell 10, a fuel cell converter 11, a secondary battery converter 12, a secondary battery 13, inverters 14, 16, and 18, a drive motor 15, an air compressor motor 17, an auxiliaries motor 19, a control unit 20, and system power supply wiring Wp. In the example shown in FIG. 1, the control unit 20 is composed of a fuel cell control unit 20a, a fuel cell converter control unit 20b, a secondary battery control unit 20c, and a motor control unit 20d. In the example shown in FIG. 1, the control unit 20 is composed of a plurality of control units. However, the control unit 20 may be composed of one control unit (e.g., Micro Controller Unit (MCU)) or a plurality of MCUs each including two or more control units may be used as the control unit 20.

The fuel cell 10 is a power production device with its amount of power production controlled in accordance with an air flow rate. In FIG. 1, a path for supplying air to the fuel cell 10 is not shown. The flow rate of air supplied to the fuel cell 10 is controlled by the inverter 16 and the air compressor motor 17.

The fuel cell converter 11 boosts an output voltage Vfc of the fuel cell 10 to a preset system voltage, transmits the system voltage, and outputs it to the system power supply wiring Wp connected to a load circuit. Further, the fuel cell converter 11 supplies a current required in the fuel cell system to the respective blocks of the fuel cell system while keeping the system voltage constant.

The secondary battery converter 12 extracts electric power from the secondary battery 13 and charges the secondary battery 13 based on redundant electric power in the system. When the electric power is extracted from the secondary battery 13, the secondary battery converter 12 boosts the output voltage of the secondary battery 13 to the system voltage and outputs it to the system power supply wiring Wp to which the system voltage is transmitted. On the other hand, when the secondary battery 13 is charged, the secondary battery converter 12 steps down the system voltage of the system power supply wiring Wp and supplies charging electric power having a voltage corresponding to the output voltage of the secondary battery 13 to the secondary battery 13. That is, the secondary battery 13 uses the system power supply wiring Wp to which the system voltage is transmitted as an input/output destination of the electric power. A pair of the fuel cell 10 and the fuel cell converter 11 and a pair of the secondary battery 13 and the secondary battery converter 12 are provided in parallel to the system power supply wiring Wp. Note that the secondary battery converter 12 can be omitted.

The secondary battery 13 is, for example, a rechargeable battery such as a nickel hydrogen secondary battery or a lithium ion secondary battery, in the example shown in FIG. 1, the secondary battery 13 is configured as a battery unit including a plurality of secondary batteries and sensors for monitoring charged/discharged states of the batteries. The battery unit includes a voltage sensor and a current sensor. The voltage sensor monitors the output voltage of the secondary battery 13, and the current sensor monitors an input/output current of the secondary battery 13. Results of the monitoring by these sensors are used for calculating the estimated SOC in the secondary battery control unit 20c, which will be described later. Note that that the voltage sensor and the current sensor may be configured in such a way as to monitor the states of the batteries outside the battery unit.

In the fuel cell system 1 according to the first embodiment, a combination of inverters and motors such as the inverter 14, the drive motor 15, the inverter 16, the air compressor motor 17, and the like serves as a load circuit.

The inverter 14 generates a drive signal for driving the drive motor 15 from the system voltage supplied from the fuel cell converter 11 and the secondary battery converter 12. The inverter 16 generates a drive signal for driving the air compressor motor 17 from the system voltage supplied from the fuel cell converter 11 and the secondary battery converter 12. The inverter 18 generates a drive signal for driving the auxiliaries motor 19 from the system voltage supplied from the fuel cell converter 11 and the secondary battery converter 12.

The drive motor 15 is, for example, a motor for moving the vehicle, and consumes a large amount of electric power. The air compressor motor 17 is a motor for operating a compressor. The compressor controls the flow rate of the air supplied to the fuel cell 10. The auxiliaries motor 19 is, for example, a motor for operating auxiliaries such as a hydrogen pump and a water pump.

In the fuel cell system 1 according to the first embodiment, the output voltage Vfc of the fuel cell 10 is lowered in order to perform the catalyst activation process for activating a catalyst of the fuel cell 10. The fuel cell system 1 according to the first embodiment has a feature in the control method of this catalyst activation process, in the fuel cell system 1 according to the first embodiment, the catalyst activation process is performed by controlling the system using the control unit 20. Hereinafter, the catalyst activation process of the fuel cell system 1 according to the first embodiment will be described. In the following description, the catalyst activation process is referred to as refresh control.

Figure 2:
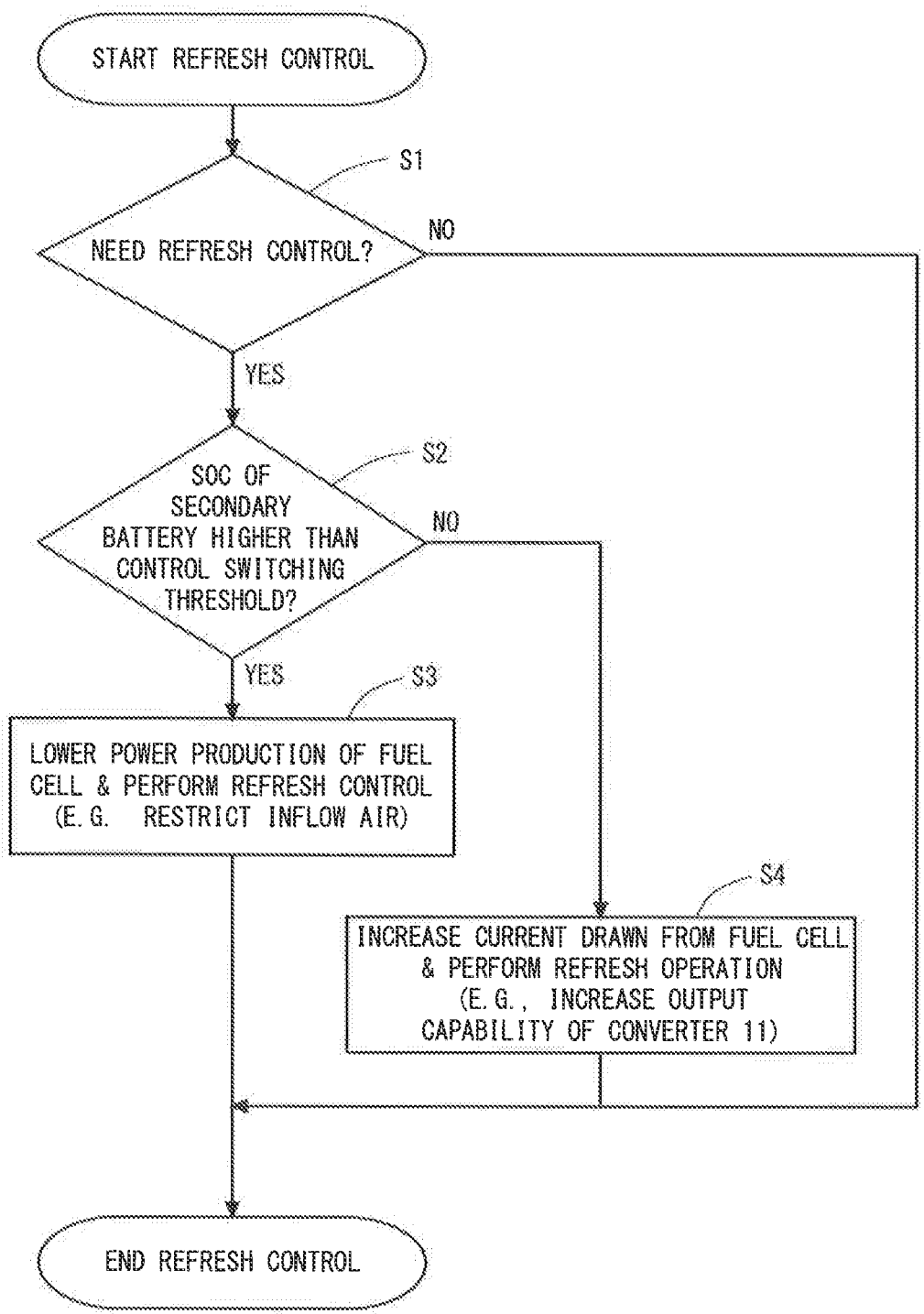
FIG. 2 is a flowchart for describing a flow of a catalyst activation process of the fuel cell system according to the first embodiment.

FIG. 2 is a flowchart for describing a flow of the catalyst activation process (e.g., the refresh control) of the fuel cell system 1 according to the first embodiment. As shown in FIG. 2, when the refresh control is started in the fuel cell system f according to the first embodiment, firstly, it is evaluated as to whether or not the refresh control for the fuel cell 10 is necessary (Step S1). If the refresh control is performed on the fuel cell 10 in a state where deterioration has progressed, the fuel cell 10 may further deteriorate. For this reason, in the fuel cell system 1 according to the first embodiment, for example, if the time from when the use of the fuel cell 10 has started or an index that enables the deterioration to be evaluated, e.g., integrated amount of power production or the like, satisfies a preset deterioration condition, it is determined that the refresh control is unnecessary, and the refresh control is ended.

Next, when it is determined that the refresh control is necessary in the evaluation of Step S1, in the fuel cell system 1 according to the first embodiment, the secondary battery control unit 20c calculates the SOC (State Of Charge) of the secondary battery 13. To be more specific, the secondary battery control unit 20c calculates the SOC by applying a battery voltage, a battery current, and a temperature obtained from the secondary battery 13 to an SOC estimation equation that is prepared in advance. Then, in the fuel cell system 1 according to the first embodiment, the secondary battery control unit 20c evaluates as to whether or not the current SOC is equal to or greater than a preset control switching threshold (Step S2). In the first embodiment, a target state of charge (e.g., target SOC) is used as the control switching threshold.

If it is determined in Step S2 that the SOC is equal to or greater than the control switching threshold, in the fuel cell system 1 according to the first embodiment, the secondary battery control unit 20c selects and performs a first catalyst activation process based on a previously prepared program (Step S3). In the first catalyst activation process, while a current Ifc drawn from the fuel cell 10 by the fuel cell converter 11 is maintained at the same value as that before the refresh control, the flow rate of the air supplied to the fuel cell by the air compressor is reduced to be less than that before the refresh control.

If it is determined in Step S2 that the SOC is less than the control switching threshold, in the fuel cell system 1 according to the first embodiment, the secondary battery control unit 20c selects and performs a second catalyst activation process based on a previously prepared program (Step S4). In the second catalyst activation process, while the air compressor maintains the flow rate of the air supplied to the fuel cell 10 at the same value as that before the refresh control, the current Ifc drawn from the fuel cell 10 by the fuel cell converter 11 is increased to be greater than that before the refresh control.

Note that the control on the flow rate of the air from the air compressor is performed by the motor control unit 20d operating the inverter 16 and the air compressor motor 17 based on a command from the secondary battery control unit 20c. The process of increasing the current drawn from the fuel cell 10 is performed by the fuel cell converter control unit 20b operating the fuel cell converter 11 based on a command from the secondary battery control unit 20c.

Figure 3:
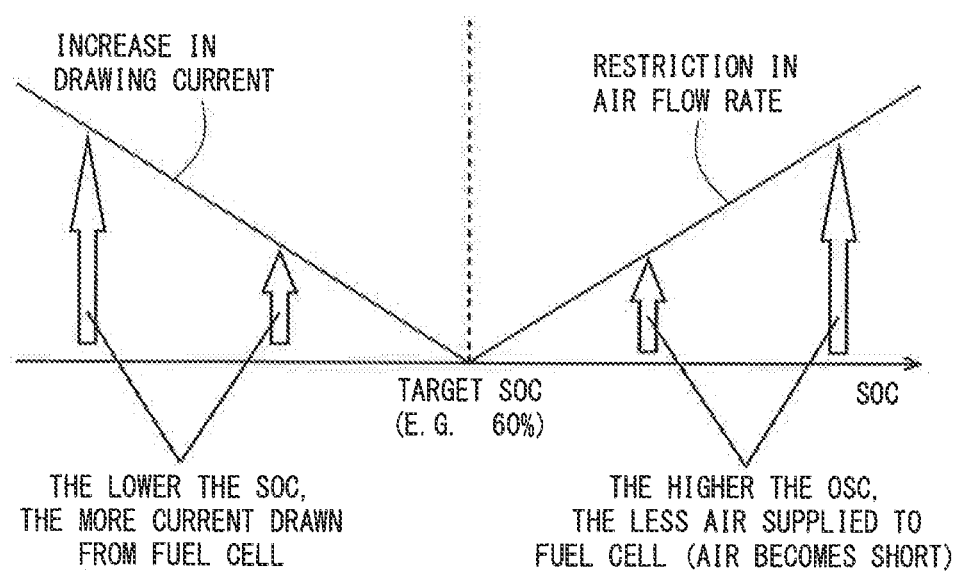
FIG. 3 is a drawing for describing a state of switching a catalyst activation method in the catalyst activation process of the fuel cell system according to the first embodiment.

The switching of the catalyst activation process in the fuel cell system 1 according to the first embodiment will be described in more detail with reference to another drawing. FIG. 3 is a drawing for describing a state of switching catalyst activation methods in the catalyst activation process in the fuel cell system according to the first embodiment.

As shown in FIG. 3, in the fuel cell system 1 according to the first embodiment, the target SOC is used as the control switching threshold. In the fuel cell system 1 according to the first embodiment, when the SOC of the secondary battery 13 at the time the refresh control is performed is equal to or greater than the target SOC, the power production of the fuel cell 10 is lowered by restricting the air flow rate of the air supplied to the fuel cell 10 while keeping the amount of the current drawn from the fuel cell 10 at the same value as that before the refresh control. Further, control is performed such that the greater the difference between the SOC of the secondary battery 13 and the target SOC, the greater the restricted air flow rate becomes.

Moreover, in the fuel cell system 1 according to the first embodiment, when the SOC of the secondary battery 13 at the time the refresh control is performed is less than the target SOC, the output voltage Vo of the fuel cell 10 is lowered by increasing the amount of the current drawn from the fuel cell 10 while keeping the flow rate of the air supplied to the fuel cell 10 at the same value as that before the refresh control. Further, control is performed such that the greater the difference between the SOC of the secondary battery 13 and the target SOC, the greater the amount of the drawing current becomes.

The target SOC is, for example 60%. This percentage of the SOC indicates that the secondary battery 13 is supposed to be sufficiently charged/discharged regardless of the running state of the vehicle. That is, it is preferable that the value of the target SOC be set to a value sufficient for charging/discharging the secondary battery to be used regardless of the running state of the vehicle.

Next, in the fuel cell system 1, the power production state of the fuel cell 10 and the charge/discharge state of the secondary battery 13 in the first catalyst activation process and the second catalyst activation process according to the first embodiment will be described.

Figure 4:
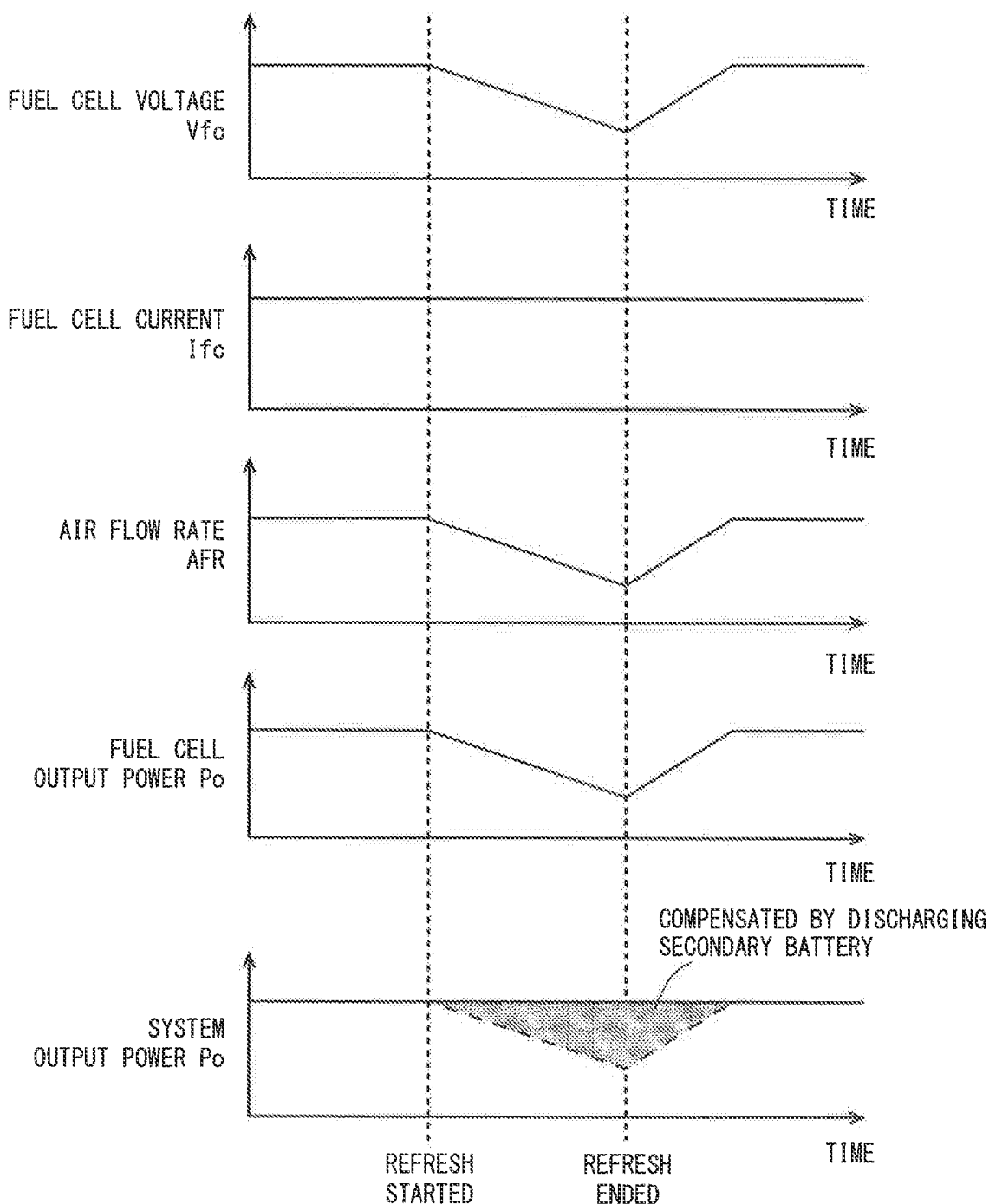
FIG. 4 is a timing chart for describing a change in each parameter of a first catalyst activation process in the fuel cell system according to the first embodiment.

FIG. 4 is a timing chart for describing a change in each parameter of the first catalyst activation process in the fuel cell system 1 according to the first embodiment. As shown in FIG. 4, in the first catalyst activation process, an air flow rate AFR of the air supplied to the fuel cell 10 is lowered in accordance with the start of the refresh control to thereby lower the power production capacity of the fuel cell 10. Consequently, the output power Po of the fuel cell 10 is lowered. At this time, in the first catalyst activation process, as the output current Ifc of the fuel cell 10 required by the fuel cell converter 11 does not change, the output voltage Vfc of the fuel cell 10 is lowered. In the fuel cell system 1 according to the first embodiment, output power Po of the fuel cell 10 is lowered. Thus, the system output power output from the fuel cell converter 11 is lowered. At this time, in the fuel cell system 1 according to the first embodiment, the shortage of the system output power Po caused by the fuel cell 10 is compensated for by the secondary battery 13. By doing so, the system output power Po is kept constant. Therefore, in the fuel cell system 1 according to the first embodiment, the SOC of the secondary battery 13 that is greater than the target SOC when the refresh control is started is lowered to bring the SOC of the secondary battery 13 close to the target SOC.

Figure 5:
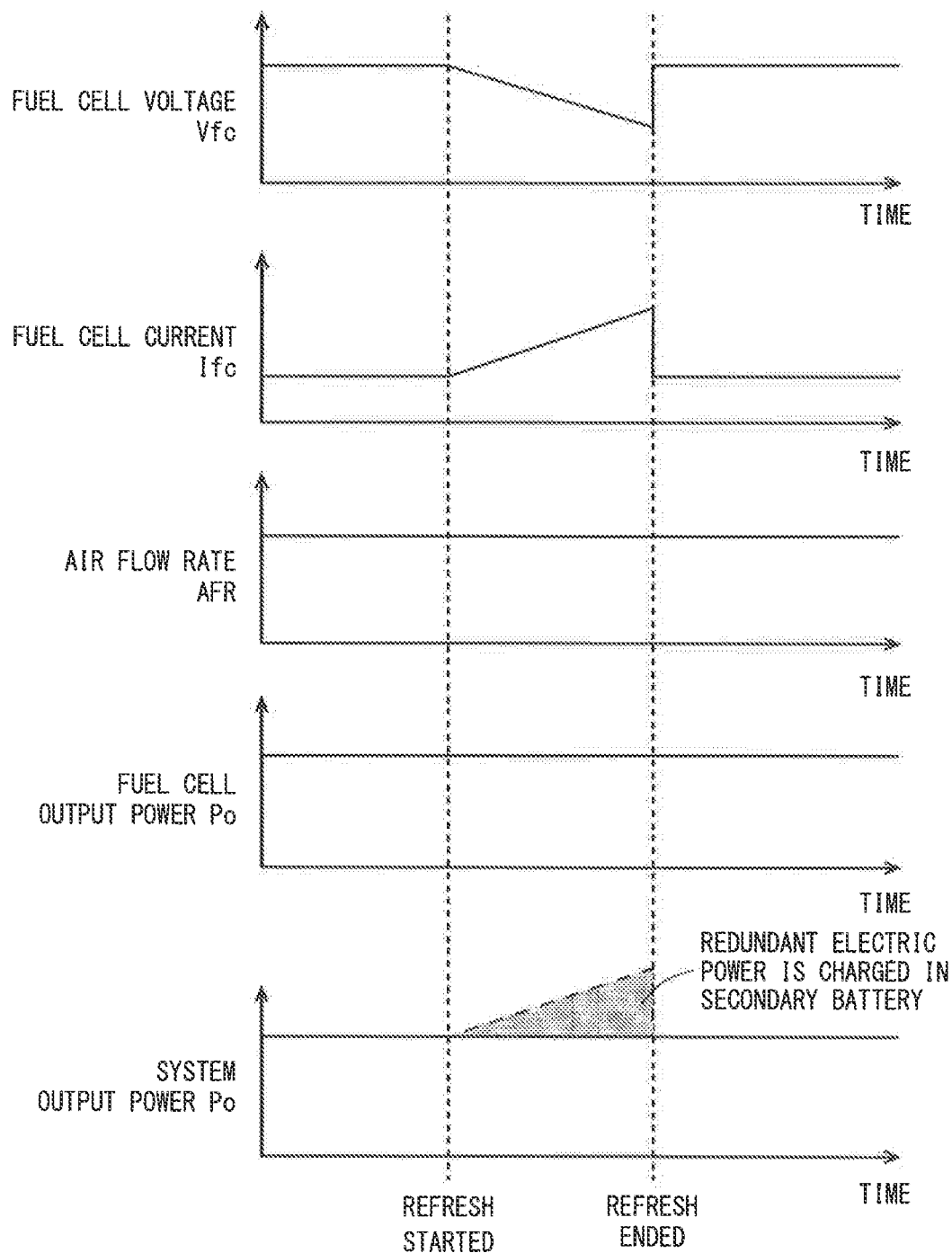
FIG. 5 is a timing chart for describing a change in each parameter of a second catalyst activation process in the fuel cell system according to the first embodiment.

FIG. 5 is a timing chart for describing a change in each parameter of the second catalyst activation process in the fuel cell system 1 according to the first embodiment. As shown in FIG. 5, in the second catalyst activation process, while the air flow rate AFR of the air supplied to the fuel cell 10 is kept constant in order to keep the output power Po of the fuel cell 10 constant, the current Ifc drawn from the fuel cell 10 is increased in accordance with the start of the refresh control. Consequently, the output voltage Vfc of the fuel cell 10 is lowered. Further, in the fuel cell system 1 according to the first embodiment, as the current output from the fuel cell converter 11 is increased, the system output power Po is increased. At this time, in the fuel cell system 1 according to the first embodiment, the system output power Po becomes redundant due to the fuel cell 10. In the fuel cell system 1 according to the first embodiment, the secondary battery 13 is charged with this redundant power, so that the system output power Po is kept constant. In this manner, in the fuel cell system 1 according to the first embodiment, the SOC of the secondary battery 13 that is lower than the target SOC when the refresh control is started is increased to bring the SOC of the secondary battery 13 close to the target SOC.

From the above description, in the fuel cell system 1 according to the first embodiment, when the SOC of the secondary battery 13 is equal to or greater than the control switching threshold, the output voltage Vfc of the fuel cell 10 is lowered by keeping the amount of the current drawn from the fuel cell 10 constant while restricting the flow rate of the air supplied to the fuel cell 10 in order to lower the power production capacity of the fuel cell 10. On the other hand, in the fuel cell system 1 according to the first embodiment, when the SOC of the secondary battery 13 is less than the control switching threshold, the output voltage Vfc of the fuel cell 10 is lowered by increasing the amount of the current drawn from the fuel cell 10 while keeping the flow rate of the air supplied to the fuel cell 10 constant in order to keep the power production capacity of the fuel cell 10 constant. Thus, in the fuel cell system 1 according to the first embodiment, it is possible to sufficiently lower the output voltage Vfc of the fuel cell 10 in the refresh control regardless of the SOC of the secondary battery 13 and to sufficiently activate the catalyst.

Moreover, in the fuel cell system 1 according to the first embodiment, the SOC of the secondary battery 13 can be brought close to the target SOC by the above-described catalyst activation process. Accordingly, in the fuel cell system 1 according to the first embodiment, the SOC of the secondary battery 13 will not move away from the target SOC in the refresh control and instead is brought close to the target SOC, which is an ideal value.

Further, in the fuel cell system 1 according to the first embodiment, when the fuel cell 10 satisfies the preset deterioration condition, the catalyst activation process is not performed. Thus, in the fuel cell system 1 according to the first embodiment, it is possible to slow down the deterioration of the fuel cell 10 from a predetermined deteriorated state.

Second Embodiment

Figure 6:
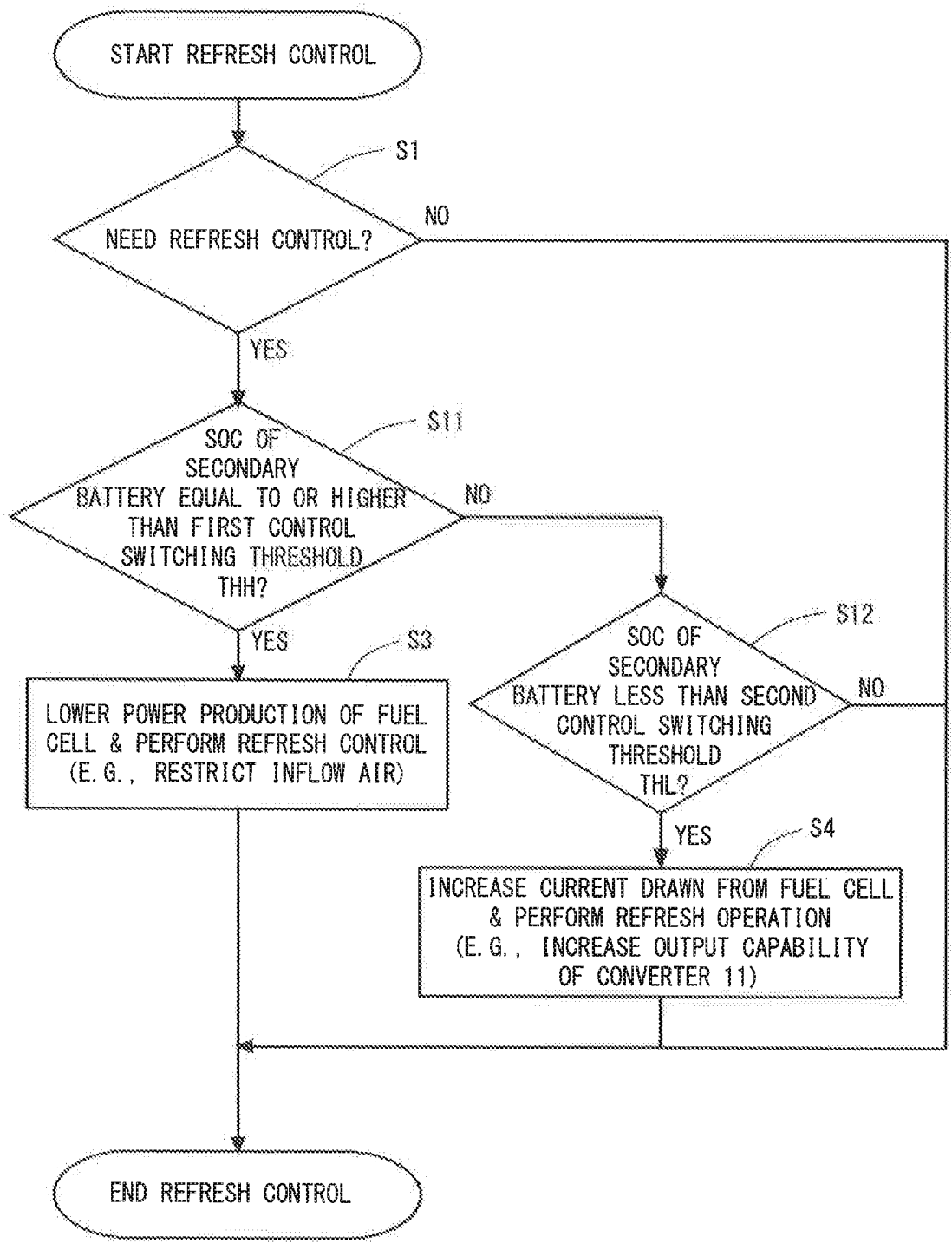
FIG. 6 is a flowchart for describing a flow of a catalyst activation process of the fuel cell system according to a second embodiment.

In a second embodiment, the catalyst activation process according to the second embodiment, which is different from the catalyst activation process described in the fuel cell system 1 according to the first embodiment, will be described. FIG. 6 is a flowchart showing a flow of the catalyst activation process of the fuel cell system according to the second embodiment.

Figure 7:
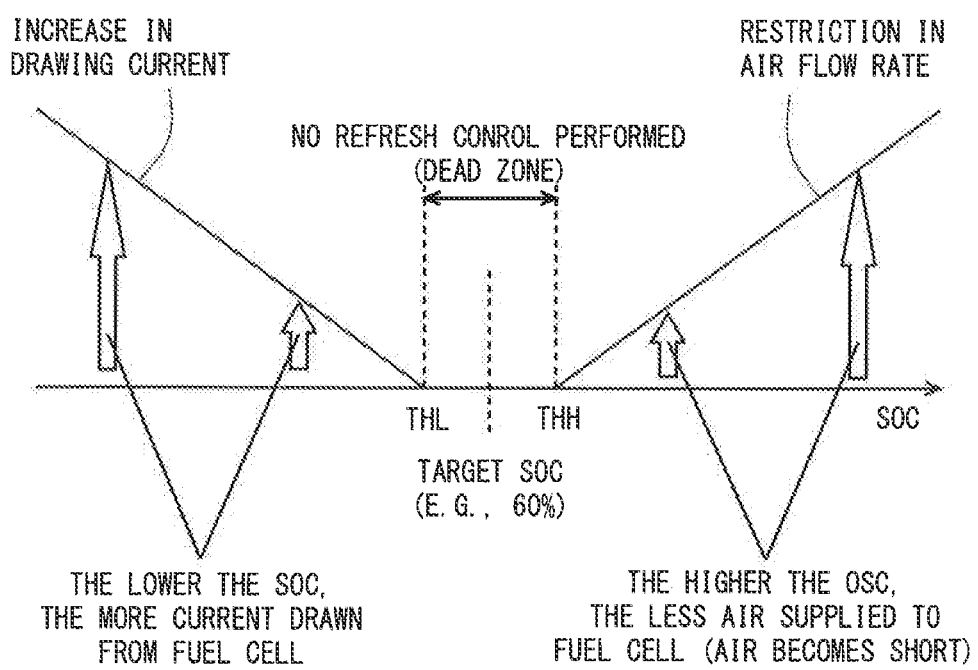
FIG. 7 is a drawing for describing a state of switching a catalyst activation method in the catalyst activation process of the fuel cell system according to the second embodiment.

As shown in FIG. 7, in the catalyst activation process according to the second embodiment, the process for evaluating the SOC in Step S2 described with reference to FIG. 2 is replaced by a process for evaluating the SOC in Steps S11 and S12.

In Step S11, it is evaluated as to whether or not the SOC of the secondary battery 13 is equal to or greater than a first control switching threshold THH. In the catalyst activation process according to the second embodiment, when the SOC of the secondary battery 13 is equal to or greater than the first control switching threshold THH in Step S11, the first catalyst activation process in Step S3 is performed. On the other hand, if it is determined in Step S11 that the SOC of the secondary battery 13 is less than the first control switching threshold THH, the process of Step S12 is performed in the catalyst activation process according to the second embodiment.

In Step S12, it is evaluated as to whether or not the SOC of the secondary battery 13 is less than a second control switching threshold THL. In the catalyst activation process according to the second embodiment, when the SOC of the secondary battery 13 is equal to or greater than the second control switching threshold THL in Step S12, the refresh control is ended without performing the catalyst activation process. On the other hand, in the catalyst activation process according to the second embodiment, when the SOC of the secondary battery 13 is less than the second control switching threshold THL in Step S12, the second catalyst activation process in Step S4 is performed.

That is, in the catalyst activation process according to the second embodiment, when the SOC of the secondary battery 13 is less than the first control switching threshold THH and is equal to or greater than the second control switching threshold THL, the refresh control is not performed. The first control switching threshold THH is, for example, an SOC which is greater than the target SOC by several %. The second control switching threshold value THL is, for example, an SOC lower than the target OSC by several %.

The switching of the catalyst activation process in the fuel cell system according to the second embodiment will be described in more detail with reference to another drawing. FIG. 7 is a drawing for describing a state of switching the catalyst activation method in the catalyst activation process of the fuel cell system according to the second embodiment.

As shown in FIG. 7, in the fuel cell system according to the second embodiment, when the SOC of the secondary battery 13 at the time the refresh control is performed is equal to or greater than the first control switching threshold THH, the power production of the fuel cell 10 is lowered by restricting the air flow rate of the air supplied to the fuel cell 10 while keeping the amount of the current drawn from the fuel cell 10 at the same value as that before the refresh control. Further, control is performed such that the greater the difference between the SOC of the secondary battery 13 and the target SOC, the greater the restricted air flow rate becomes.

Moreover, in the fuel cell system 1 according to the first embodiment, when the SOC of the secondary battery 13 at the time the refresh control is performed is less than the second control switching threshold THL, the output voltage Vo of the fuel cell 10 is lowered by increasing the amount of the current drawn from the fuel cell 10 while keeping the flow rate of the air supplied to the fuel cell 10 at the same value as that before the refresh control. Further, control is performed such that the greater the difference between the SOC of the secondary battery 13 and the target SOC, the greater the amount of the drawing current becomes.

In the second embodiment, the first control switching threshold THH is specified to be greater than the target SOC by several %, and the second control switching threshold THL is specified to be lower than the target SOC by several In the second embodiment, when the SOC of the secondary battery 13 is between the first control switching threshold THH and the second control switching threshold THL, the refresh control is not performed. Such a range of the SOC where no refresh control is performed is a dead zone, and is, for example, 60%.

In the catalyst activation process according to the second embodiment, when the SOC of the secondary battery 13 is within a certain range, the refresh control is not performed. Thus, in the catalyst activation process according to the second embodiment, when the SOC of the secondary battery 13 is near the target SOC, it is possible to prevent the refresh control from being performed, and the first catalyst activation process and the second catalyst activation process from being frequently switched. This prevents the fuel cell 10 from becoming unstable by the refresh control.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A fuel cell system comprising:
a fuel cell, an amount of power production of the fuel cell being controlled according to an air flow rate;
a fuel cell converter configured to boost an output voltage of the fuel cell to a system voltage and supplies it to system power supply wiring connected to a load circuit;
an air compressor configured to supply air to the fuel cell;
a secondary battery configured to input/output electric power from/to the system power supply wiring; and
a control unit configured to, when refresh control is performed, calculate a state of charge of the secondary battery using an output voltage and an output current of the secondary battery and control the air compressor and the fuel cell converter based on the calculated state of charge, wherein the control unit:
when the state of charge is equal to or greater than a preset target state of charge of the secondary battery, performs a first catalyst activation process where a flow rate of the air supplied to the fuel cell by the air compressor is reduced to be less than that before the refresh control is performed while keeping an amount of a current drawn from the fuel cell by the fuel cell converter at the same value as that before the refresh control is performed;

when the state of charge is less than the preset target state of charge, performs a second catalyst activation process where the value of the current drawn from the fuel cell by the fuel cell converter is increased to be greater than that before the refresh control is performed while keeping the flow rate of the air supplied to the fuel cell by the air compressor at the same value as that before the refresh control is performed; and performs control such that the greater a difference between the state of charge and the target state of charge, the greater a restricted flow rate of the air flow rate in the first catalyst activation process and the amount of the current drawn from the fuel cell in the second catalyst activation process become.

2. The fuel cell system according to claim 1, wherein
the preset target state of charge includes a first control switching state of charge and a second control switching state, the first control switching state indicating a state of charge greater than the preset target state of charge of the secondary battery, and the second control switching state of charge indicating a state of charge lower than the target state of charge, and
the control unit stops the first catalyst activation process and the second catalyst activation process in a period in which the state of charge is between the first control switching state of charge and the second control switching state of charge.

3. The fuel cell system according to claim 1, wherein when performance of the fuel cell satisfies a preset deterioration condition, the control unit does not perform the first catalyst activation process and the second catalyst activation process.

* * * * *